Figure 1:
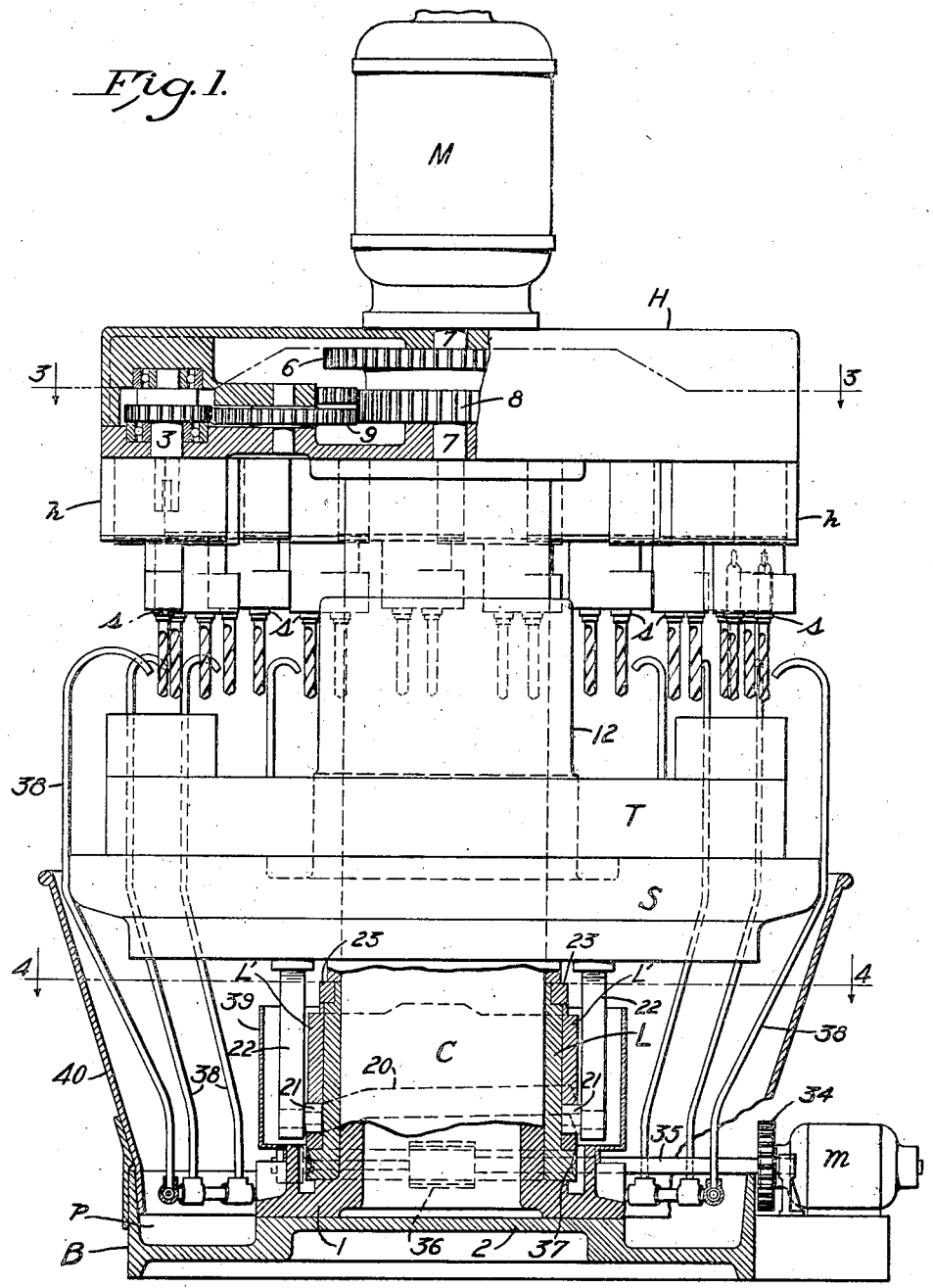

July 24, 1934.   L. L. SCHAUER ET AL   1,967,689
CAM CONTROLLED MULTISPINDLE MACHINE
Filed Dec. 16, 1930   3 Sheets-Sheet 1

Inventors
Lawrence Lee Schauer
Augustus Marius Sosa
By   Attorneys
Nathan & Bowman July 24, 1934.  L. L. SCHAUER ET AL  1,967,689
CAM CONTROLLED MULTISPINDLE MACHINE
Filed Dec. 16, 1930  3 Sheets-Sheet 2

Inventors
Lawrence Lee Schauer
Augustus Marius Sosa
By Attorneys
Nathan Bowman

July 24, 1934.   L. L. SCHAUER ET AL   1,967,689
CAM CONTROLLED MULTISPINDLE MACHINE
Filed Dec. 16, 1930    3 Sheets-Sheet 3

Inventors
Lawrence Lee Schauer
Augustus Marius Sosa
By Attorneys
Nathan & Bowman Patented July 24, 1934

1,967,689

UNITED STATES PATENT OFFICE 1,967,689

CAM CONTROLLED MULTISPINDLE MACHINE

Lawrence Lee Schauer and Augustus Marius Sosa, Cincinnati, Ohio, assignors to The Cincinnati Bickford Tool Company, Cincinnati, Ohio, a corporation of Ohio Application December 16, 1930, Serial No. 502,676

5 Claims. (Cl. 77—23)

This invention relates to automatic machine tools of the station type, i. e. machine tools provided with a plurality of operating stations and means for automatically and successively presenting work-pieces thereto for successive operation thereon by the tool, or tools, at the various stations.

Machine tools of this type have been found to be highly desirable and efficient for quantity production of work-pieces which require a plurality of operations to be performed thereon, due to the fact that the machines are entirely automatic in their action and therefore an operator is required only to secure the work blank in position and remove the finished product. Thus a single operator readily may, without inconvenience or fatigue, produce, in a given time, a relatively great number of completed workpieces.

One of the objects of this invention is to simplify the construction of machine tools of this type and thereby reduce to a minimum the cost of construction and maintenance thereof.

Another object is to construct the machine with a minimum number of movable elements and to avoid complexity in the movements of those elements which necessarily must be moved.

Still another object of the invention is so to construct the machine that the movable parts will have unusually large bearing surfaces thereby insuring rigidity and ease of movement of those parts.

A machine tool of this nature may be used to advantage for a great number of operations, such, for example, as the drilling, in a workpiece, of a plurality of holes so arranged that they may not be drilled in a single operation by a multiple spindle drilling machine of conventional form. This invention will, therefore, be described as embodied in a station-type drilling machine but it is to be understood that various other types of tools may be employed and other machining operations performed without departing from the spirit of this invention.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
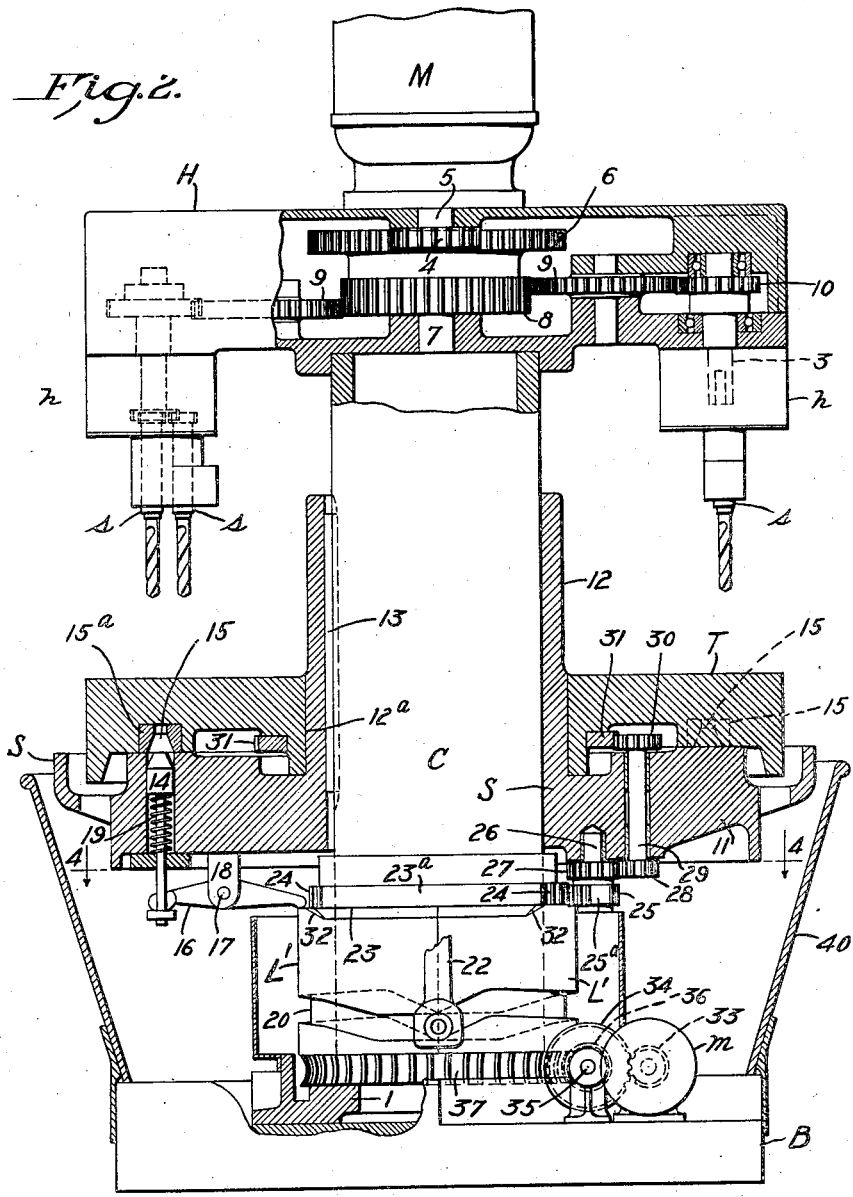
Figure 3:
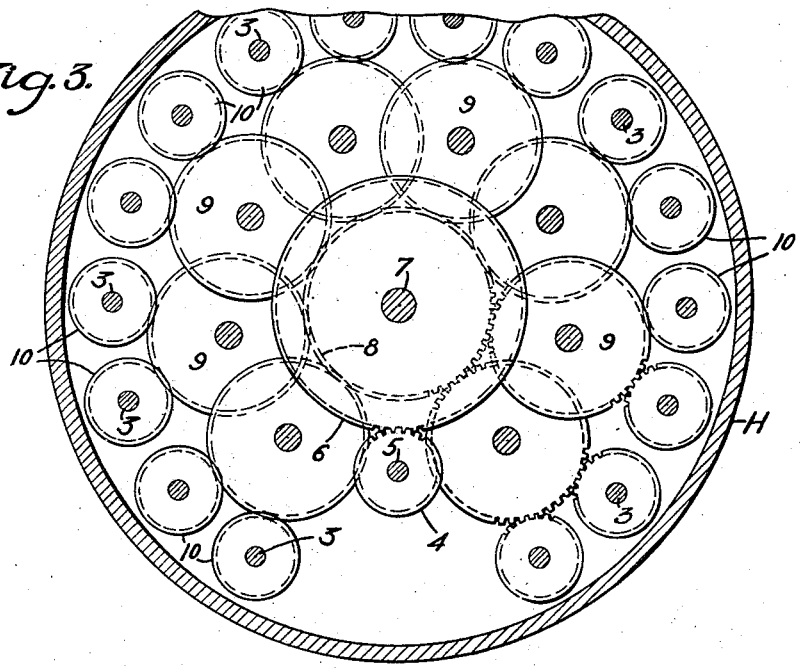
Figure 4:
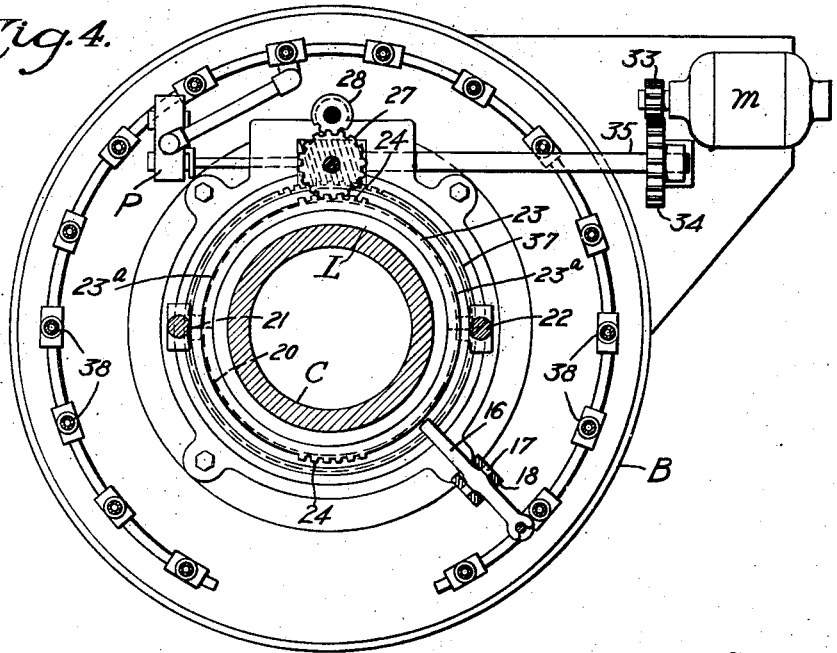

Figure 1 is a front elevation, partly in section, of a multiple spindle station-type drilling machine embodying the present invention. Fig. 2 is a vertical section of the machine shown in Fig. 1 as viewed from the right of that figure. Fig. 3 is a horizontal section substantially on the line 3—3 of Fig. 1. Fig. 4 is a similar view substantially on the line 4—4 of Figs. 1 and 2.

Referring more specifically to the drawings the invention is disclosed as embodied in a station-type drilling machine comprising a base B which forms a support for an upright column C secured thereto and also provides a sump for cutting fluid, as later will be explained. The column C is of cylindrical form and is provided at its lower end with a foot portion 1 which is secured upon a central platform 2 provided by the base. Upon the upper end of the column there is secured a tool-head H within which are journaled a plurality of driving spindles 3 corresponding in number to the number of tooling stations required, in the present disclosure sixteen.

A motor M mounted on the tool-head furnishes power to rotate the spindles 3. Power is transmitted from the motor to the spindles by a suitable gear train beginning with a pinion 4 fixed upon the motor shaft 5. The gear 4 meshes with and drives a gear 6 journaled upon a stub shaft 7 fixed in the tool head. Rotatable with the gear 6 and preferably formed integral therewith, is a gear 8 which drives a plurality of intermediate gears 9, which, in turn, drive gears 10 one of which is secured upon each of the spindles 3. Each of the spindles may carry a suitable tool, such for example, as a drill, or, if desired and as shown in the drawings, multiple tool-heads may be secured to the head H and the spindles s thereof operatively connected with and rotated by the spindles 3 in a conventional manner.

Translatably mounted on the cylindrical column C, is a saddle S having a horizontally disposed circular bed-like portion 11 and a cylindrical hub portion 12 which provides a long bearing for the saddle on the column. The saddle is held against angular movement on the column by a suitable spline 13. Supported upon the saddle S and rotatably journaled on the cylindrical portion 12$^a$ of the hub 12 is a work-table which partakes of the reciprocating movements of the saddle S and which is adapted also to have rotary movements thereon about the axis of the column. Suitable indexing mechanism, later to be described, is provided for giving to the work-table step-by-step rotary movements thereby to position work-pieces, carried by the table successively beneath the tools carried by the spindles at the various tooling stations. The machine illustrated in the drawings is provided with sixteen tooling stations, one loading station and one unloading station, the latter two of which are located at the side of the machine adjacent the operator. Thus, in this machine the work-table is given indexing movements of twenty degrees each.

After each indexing movement of the work-table the saddle S, and the work-table carried thereby are elevated on the column thereby to cause the tool, or tools, at each of the tooling stations simultaneously to operate on the work-piece therebeneath. When the operation has been completed the saddle and table are lowered and another indexing movement is effected, and so on until each work-blank has been operated on at each tooling station and has arrived at the unloading station. Thus it will be seen that the machine is entirely automatic, it being necessary for the operator only to secure a work-blank on the table at the loading station and remove the finished work-piece when it returns to him at the unloading station.

To insure that the work-piece will be accurately located with respect to the tools and that the work-table may not be inadvertently shifted on the saddle, locating and locking means comprising a lock-bolt 14 having a tapered end adapted to engage similarly shaped notches 15 formed in the table positively locate the table after each indexing movement and lock the two against angular movement except during the indexing movement. A lever 16, fulcrumed at 17 on a bracket 18 carried by the saddle, is actuated at predetermined times in opposition to a spring 19 to withdraw the lock bolt. Preferably the locking notches 15 will be formed in blocks 15ᵃ of high grade metal embedded in the work-table.

One of the features of this invention is the provision of a single continuously rotating member L journaled on the column C for reciprocating the saddle indexing the work-table and actuating the lock bolt. This member is formed with an annular cam groove 20 engaged by rollers 21 carried by rods 22 fastened to the underside of the saddle S. Thus upon rotation of the member the cam causes the saddle to be elevated and lowered on the column. Preferably the cam groove 20 will not be cut directly in the member L but will be formed in two semi-cylindrical sections L' detachably secured to the member L so that they may readily be removed and replaced by others when it is desired to vary the action of the machine as may be required for other operations. The cam groove is preferably made duplex i. e. the groove is duplicated in each of the sections L', and the member is preferably given a rotation of 180 degrees for each complete tooling operation. By this arrangement it becomes possible to use two connecting rods 22 between the two cycle cam and the saddle thereby lifting the saddle simultaneously at diametrically opposite sides of the column, thus precluding binding of the saddle on the column. The contour of the cam groove is preferably such that the saddle is given first a rapid upward movement to bring the work-pieces to the tools, then a slow feeding movement upward to cause the drills to penetrate the work, next a rapid downward movement to remove the work from the drills and finally a dwell during which the work-table is indexed.

The member L also carries a ring 23 in the nature of an interrupted gear. This ring is provided at diametrically opposite sides with two series of gear teeth 24 adapted during rotation of the member alternately to engage the teeth of an interrupted gear 25 journaled on a stud 26 secured in the saddle.

Secured to and rotatable with the gear 25 is a gear 27 which meshes with a gear 28 fixed upon the lower end of a shaft 29 journaled in the saddle. On the upper end of the shaft 29 there is secured a gear 30 which meshes with and drives a large gear 31 carried by the work-table. Thus upon each one-half rotation of the member L the table T is given an indexing movement. During the time that the saddle is being elevated and lowered one of the blank portions 23ᵃ of the ring 23, which rotates continuously, is in engagement with the blank section 25ᵃ of the gear 25 and therefore no motion is transmitted to the indexing mechanism.

The member L, or the cam sections L' also provide two cams 32 adapted at a predetermined point in each half rotation of the member L to actuate the lever 16 to withdraw the lock-bolt 14 from one of the notches 15. Power to rotate the member L is furnished by a motor $m$ mounted on the base B. A pinion 33 fixed to the motor shaft meshes with and drives a gear 34 secured upon a horizontal shaft 35 journaled in bearings supported by the base. Motion is transmitted from the shaft 35 to the member L at a materially reduced rate by means of a worm 36, secured upon said shaft which drives a worm wheel 37, secured to the member L.

The tools at each of the tooling stations are cooled and lubricated by cutting compound held within a sump $p$ formed in the base and transmitted to the tooling stations through individual pipes 38 under the action of a pump P driven from the shaft 35.

A guard 39 surrounds the member L and the parts carried thereby to exclude dirt and chips therefrom. A second guard 40 secured at its bottom end to the base B and having its upper end inclosing the saddle S serves to return the cutting compound to the sump.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A station-type drilling machine combining and upright column; a saddle translatably but non-rotatably mounted thereon; a work-table rotatably mounted on said saddle; a plurality of tooling stations arranged about the axis of said column; a tool at each station; an actuating sleeve rotatably journaled on said column beneath said saddle; means to rotate said sleeve; means, including a gear on said work-table, an interrupted gear on said sleeve and a connecting gear train carried by saddle, to index said work-table on said saddle to position workpieces carried thereby successively beneath said tools; and an annular cam provided by said rotatable sleeve and means actuated thereby to translate said saddle on said column after each indexing movement, thereby to cause said workpieces to engage said tools.

2. A drilling machine combining a column; a saddle translatably mounted thereon; a table rotatably mounted on said saddle; an actuating sleeve rotatably mounted on said column; a first cam on said sleeve for reciprocating said saddle and the table thereon; an interrupted gear on said sleeve; indexing means for said table comprising a gear on said table, a gear train carried by said saddle and actuated by said interrupted gear to give to said table indexing movements in timed relation with its reciprocations; a locking bolt carried by said saddle adapted to engage apertures in said table to lock the table against rotation relative to said saddle; a second cam on said sleeve; and means actuated by said second cam to withdraw said locking bolt from said apertures to permit said table to be rotated by said indexing mechanism.

3. A drilling machine combining a column, a saddle translatably mounted thereon; a table rotatably mounted on said saddle; a sleeve rotatably mounted on said column beneath said saddle; an electric motor and speed reduction gearing for rotating said sleeve; a cam formed on said sleeve; an operative connection between said cam and said saddle to effect reciprocations of the latter, said connection comprising two depending rods connected to said saddle at opposite sides of said column and studs carried by said rods and engaging said cam; means to index said table after each complete reciprocation thereof comprising an interrupted gear on said sleeve; a gear on said table, and a gear train carried by said saddle actuated by said interrupted gear and transmitting motion to the gear on said table; and means to lock said table against rotation after each indexing movement thereof.

4. A drilling machine combining an upright column; a head secured upon the upper end thereof; a plurality of equally spaced sets of tool spindles secured in said head about the axis of said column; means carried by said head to rotate said spindles; a saddle translatably mounted on said column beneath said head; a work-table rotatably mounted on said saddle; means to index said work-table to present workpieces carried thereby successively to the action of tools carried by said sets of spindles; means operative between the successive indexing movements of said table to lock said table to said saddle; a sleeve member rotatably journaled on said column beneath said saddle; means to give to said member continuous rotary motion; and means carried by said sleeve and actuated by the rotary movement thereof for reciprocating said saddle, for actuating said indexing means and for actuating said locking means in a predetermined cycle to effect continuous operation of said machine.

5. A multiple station drilling machine comprising a column; a saddle translatably mounted thereon; a work-table rotatably mounted on said saddle; a tool head secured upon said column above said work-table and provided with a plurality of equally spaced sets of tool spindles; a sleeve rotatably journaled on said column beneath said saddle; means to rotate said sleeve; a first cam on said sleeve for reciprocating said saddle on said column; means comprising a spring pressed lock bolt carried by said saddle and adapted to engage an aperture in said table to lock said table and saddle against relative rotation; a lever mounted on said saddle and engaging said lock bolt; a second cam on said sleeve adapted at predetermined times to actuate said lever to cause it to withdraw said lock bolt from said aperture; and means operative while said lock bolt is withdrawn to index said table on said saddle, said indexing means comprising an interrupted gear on said sleeve; an uninterrupted gear on said table, and a connecting gear train carried by said saddle for periodically indexing said table by the continuous rotation of said sleeve.

LAWRENCE LEE SCHAUER.
AUGUSTUS MARIUS SOSA.